United States Patent [19]

Vincent

[11] 4,390,515
[45] Jun. 28, 1983

[54] METHOD AND APPARATUS FOR RECOVERING ELEMENTAL SULFUR

[75] Inventor: Arthur L. Vincent, Monrovia, Calif.

[73] Assignee: International Telephone & Telegraph, New York, N.Y.

[21] Appl. No.: 58,828

[22] Filed: Jul. 18, 1979

[51] Int. Cl.³ .............................................. C01B 17/02
[52] U.S. Cl. ......................... 423/573 G; 423/567 R; 423/574 A; 422/110
[58] Field of Search ............ 423/567, 573, 574, 576; 422/110

[56] References Cited

U.S. PATENT DOCUMENTS

| | | | |
|---|---|---|---|
| Re. 28,864 | 6/1976 | Andral et al. | 422/110 |
| 2,200,529 | 5/1950 | Bahr et al. | 423/573 |
| 2,650,154 | 8/1953 | Anderson | 423/574 G |
| 2,690,961 | 10/1954 | Keith | 423/574 L |
| 2,919,976 | 1/1960 | Feagan | 423/574 |
| 3,026,184 | 3/1962 | Karasek | 422/62 |
| 3,130,187 | 4/1964 | Tohn et al. | 422/111 |
| 3,166,381 | 1/1965 | Loss | 422/62 |
| 3,219,415 | 11/1965 | Hensley | 423/574 |
| 3,312,529 | 4/1967 | Evano | 422/62 |
| 3,424,560 | 1/1969 | Carmassi et al. | 422/62 |
| 3,486,860 | 12/1969 | Van Pool | 423/574 |
| 3,837,785 | 9/1974 | Evans | 422/111 X |
| 3,854,884 | 12/1974 | Robison | 422/62 |
| 3,871,831 | 3/1975 | Andral et al. | 422/62 |
| 3,904,370 | 9/1975 | Robison | 423/574 |
| 3,933,992 | 1/1976 | Andral et al. | 423/573 |
| 3,945,904 | 3/1976 | Robison | 423/574 |
| 3,985,864 | 10/1976 | Vautrain | 423/574 X |
| 4,027,201 | 5/1977 | Vautrain et al. | 422/110 |
| 4,100,266 | 1/1978 | Smith | 423/574 |

FOREIGN PATENT DOCUMENTS 1281240  7/1972  United Kingdom .

OTHER PUBLICATIONS

Opekar et al., "How a Computer can Optimize Sulfur-Plant Design Operations", The Oil and Gas Journal, May 2, 1966, pp. 86–89.
Air Pollution Engineering Manual, ed. by John Danielson, EPA, May, 1973.

*Primary Examiner*—Gregory A. Heller
*Attorney, Agent, or Firm*—T. E. Kristofferson; A. D. Stolzy

[57] ABSTRACT

Elemental sulfur is recovered from acid gas containing hydrogen sulfide ($H_2S$). Such $H_2S$ may be produced from any conventional source such as an amine desulfurization plant. The acid gas and the $H_2S$ therein is contacted with oxygen ($O_2$) or the oxygen in air in a stoichiometric amount such that one-third, by weight, of the flowing $H_2S$ is oxidized (the $H_2S$ is measured and the $O_2$ thereby controlled). Oxidation takes place thus:

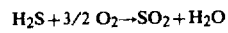

$$H_2S + 3/2\, O_2 \rightarrow SO_2 + H_2O$$

The sulfur dioxide ($SO_2$) indicated in the equation above is then further reacted in a conventional Claus process sulfur recovery plant with the balance of the $H_2S$. That is, due to the fact that only the said one-third of the $H_2S$ is oxidized, there is a two-thirds remainder of the same and it is this two-thirds remainder which is referred to above as the "balance." This balance is converted to elemental sulfur (S) in the following manner:

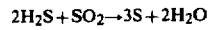

$$2H_2S + SO_2 \rightarrow 3S + 2H_2O$$

5 Claims, 1 Drawing Figure

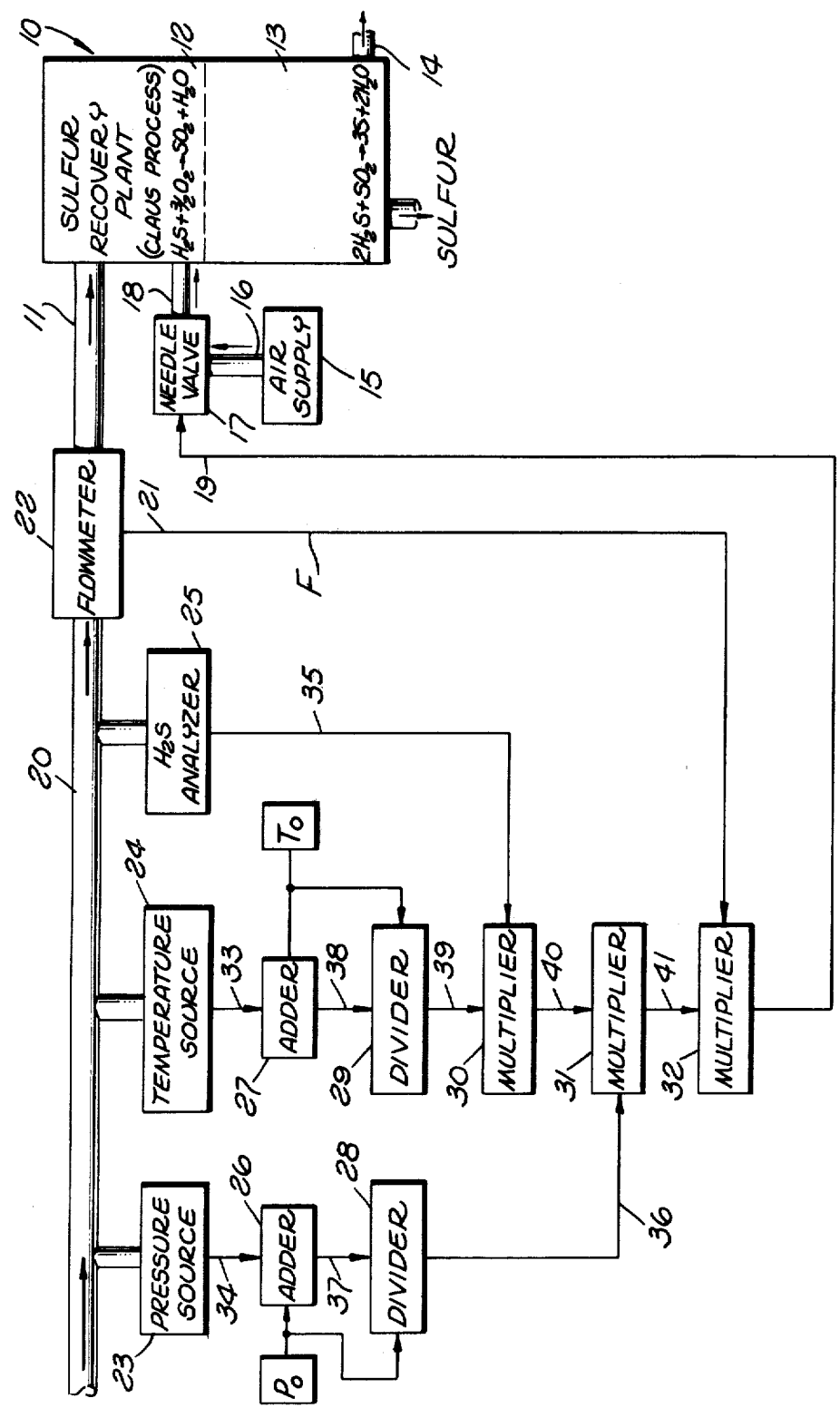

METHOD AND APPARATUS FOR RECOVERING ELEMENTAL SULFUR

BACKGROUND OF THE INVENTION

This invention relates to the art of recovering sulfur, and more particularly to a sulfur recovery process and apparatus for use in connection therewith.

PRIOR ART STATEMENT

It is old in the art to practice the Claus process by the use of feedback upstream of a flow of hydrogen sulfide ($H_2S$) to vary the amount of air including oxygen ($O_2$) to react with the $H_2S$ in accordance with two variables ($H_2S$ and $SO_2$). This is disclosed in Robison U.S. Pat. No. 3,854,884 issued Dec. 17, 1974, and Robinson U.S. Pat. No. 3,945,904, issued Mar. 23, 1976. Both of these methods and systems involve a rather large time lag and error.

SUMMARY OF THE INVENTION

In accordance with the present invention an analog or digital open loop system is provided rapidly responsive only to one variable, viz. $H_2S$, to control the amount of $O_2$ for creating a reaction to produce elemental sulfur.

BRIEF DESCRIPTION OF THE DRAWING

In the accompanying drawing which illustrates an exemplary embodiment of the present invention:

The FIGURE is a block diagram of apparatus to convert $H_2S$ to elemental sulfur.

DESCRIPTION OF THE PREFERRED EMBODIMENT

The Claus process is the process used to manufacture sulfur from acid gas—gas containing 15-80% hydrogen sulfide. Nearly 40% of the sulfur produced in the United States in 1977 was manufactured by the Claus process. The feed stock for the Claus process comes mainly from the "waste" stream from natural gas and petroleum processing. The recovery of sulfur from these streams converts what could constitute a nuisance into a viable economic by-product.

The Claus process operates on two reactions. The first is the oxidation of one-third of the $H_2S$ with a limited quantity of air to form sulfur dioxide ($SO_2$).

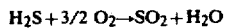

The second reaction is the catalytic reaction of the remaining $H_2S$ with the $SO_2$ to form sulfur and water.

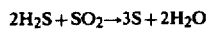

The efficiency of the process is dependent on the 2.0 hydrogen sulfide to the 1.0 sulfur dioxide ratio. An increase in that ratio to 2.1 causes a reduction in the theoretical efficiency from 100% to 97%. Therefore, to maintain peak efficiency in a plant, that ratio and, therefore, the air flow to the process must be controlled. The only instrumentation currently on the market, however, is a very expensive ($25-$30 thousand dollars) system manufactured by DuPont.

Further, this system is not always dependable. Because of this, most plants assume a given acid gas $H_2S$ concentration and control the air flow on the acid gas flow and suffer the consequential efficiency variations. In rural areas, reduced efficiencies might be acceptable, but in areas of air pollution consciousness they are not acceptable because the unreacted sulfur compounds end up in the process flue gas.

As stated previously, a ratio control instrument based on the analysis of the process tail gas by coulometric titration was developed. These sulfur analyzers were ideal for monitoring the tail gas because the other sulfur compounds present did not interfere with the analysis. However, because the concentrations were still in the 1-2% range, dilution sampling was necessary, and because the tail gas contained quantities of molten sulfur droplets, the sampling probes continually fouled up.

Because of the large capacity of these plants and the small residence times (30-45 seconds), there is always the question of how well a feedback type system can control the process. The answer to that question really resides in the variability of the acid gas concentration. It will work for long period variations, but not for short.

The present invention involves an open loop system based on controlling the air to the process by measuring the flow and concentration of the incoming acid gas. Because the acid gas concentrations can reach as high as 80% $H_2S$, an open loop system is not readily amenable to titration analysis because the high dilutions which would be required cannot be done reliably. However, if we are not constrained to titration analysis, there are other modes of analysis which can be used. Chromatographic analysis as well as optical analysis, can perform these analyses. The optical analyses, both infrared and ultraviolet, are the preferred methods since they are simple, fast and continuous and can handle the high sulfur concentration directly.

In the infrared, $H_2S$ absorbs weakly at about 2.6 and 3.9 $\mu$m. That these bands are weak could be an advantage in measuring at these very high concentrations. It is also fortunate that other compounds likely to be present do not absorb in this region.

Hydrogen sulfide also absorbs strongly in the ultraviolet between 195 and 230 nanometers. The strength of this absorption will require short path lengths to get a suitable analysis, but this could also be an advantage because several conventional liquid chromatographic ultraviolet analyzers are available. They could provide an inexpensive detection and analysis source.

A typical open loop system (the present invention) is that shown in the FIGURE. The flow of acid gas is measured, as is its $H_2S$ concentration, yielding a measure of the mass flow of $H_2S$ into the process. These measurements might be handled by a microprocessor controller for control, or perhaps better, trim control of the process air.

An outstanding advantage of an open loop system for Claus process control is that it would be a more rapid, more responsive control than a feedback system. A feedback control could be very slow. Another advantage is that the open loop system can be made in a less expensive manner. The single point optical $H_2S$ analysis is simpler than the two point coulometric analysis. In all, the open loop method is a simpler, less involved method of control.

The process of the present invention may be practiced by the use of an extremely large number of widely differing equipments. The one shown in the FIGURE is just one of many possible examples of such equipments. The purpose of the said one equipment is to take one mole out of each three moles of $H_2S$ in acid gas entering plant 10 via conduit 11 and to oxidize with 1.5 moles of oxygen thus:

$$H_2S + 3/2O_2 \rightarrow SO_2 + H_2O \quad (1)$$

The $SO_2$ is sulfur dioxide and the $H_2O$ is water.

The oxygen is supplied in air from a source 15 through a conduit 16, a needle valve 17 and a conduit 18. The amount of oxygen is changed with detected mass flow of $H_2S$ in conduit 11 via electrical input lead 19 to needle valve 17.

Plant 10 has two sections 12 and 13. In section 12, the reaction of equation (1) is produced. In section 13, the following reaction is produced:

$$2H_2S + SO_2 \rightarrow 3S + 2H_2O \quad (2)$$

The term 3S in equation (2) thus represents elemental sulfur (S). Sulfur is thus reduced or eliminated in outlet conduit 14 to prevent air pollution or for other recovery purposes if the outlet conduit 14 should dump directly into the atmosphere.

Note will be taken in equation (2) that the $2H_2S$ is the two-thirds of the $H_2S$ after the one-third ($H_2S$) is oxidized in equation (1).

The water is harmless from a pollution standpoint.

Note also that the sulfur dioxide ($SO_2$) molecule in (1) is exactly the same molecule that appears in equation (2).

Plant 10 is shown diagrammatically in the FIGURE. The products of combustion of the $H_2S$ are preferably fully formed before they enter section or chamber 13. Section 13 may be a conventional reactor-coalescer and/or other conventional structure as desired.

Although the present invention does not employ feedback control of oxygen, open loop control thereof is provided by measuring the $H_2S$ flowing in conduit 11.

Needle valve 17 may be similar to or identical to needle valve 37 shown in U.S. Pat. No. 3,854,884.

As stated previously, the amount of oxygen in conduit 18 is solely controlled in accordance with the amount of $H_2S$ in conduit 11. Thus this differs from the prior art because in the prior art the $2H_2S$ and $SO_2$ in equation (2) are each measured and the $O_2$ varied to cause the ratio of 2 moles of hydrogen sulfide to be left with one mole of $SO_2$.

If the $H_2S$ mass flow rate is $m_b$ in conduit 11 and an $O_2$ mass flow rate is $m_a$ in conduit 18, $$m_a = \frac{8m_b}{17} \quad (3)$$

The numbers of equation (3) are derived from the following:

| ELEMENT | ATOMIC WEIGHT |
|---|---|
| Hydrogen | 1 |
| Sulfur | 32 |
| Oxygen | 16 |

A mole of $H_2S$ is thus $2 + 32 = 34$ grams.

A mole and a half of $O_2$ is thus $\frac{3 \times 32}{2} = 48$ grams.

See equation (1).

Thus, the stoichiometric ratio to oxidize only one-third of the $H_2S$ is:

$$\frac{m_a}{m_b} = \frac{1 \times 48}{34} \quad (4)$$

$$\frac{m_a}{m_b} = \frac{16}{34} \quad (5)$$

$$\frac{m_a}{m_b} = \frac{8}{17} \quad (6)$$

$$m_a = \frac{8m_b}{17} \quad (7)$$

Compare equation (3) with equation (7).

The mass flow rate $m_a$, in one way, can be determined by the input signal to needle valve 17 over lead 19 in accordance with:

$$m_a = \frac{(KyFT_o)(P + P_o)}{P_o(T + T_o)} \quad (8)$$

where $m_a$ is in pounds per unit time,

K is a constant, y is the fraction of $H_2S$ in inlet conduit 20, in mole percent F is the total volume rate of flow through conduit 11 (see output lead 21 of flowmeter 22) in, e.g. cubic feed per hour, P is the gage pressure within conduit 20, T is temperature (e.g. in degrees Fahrenheit) within conduit 20, $P_o$ is, for example, 14.7 psi or ambient air pressure, $T_o$ is, for example, 460 degrees ($T + T_o$ is in degrees Rankine).

Thus $P + P_o$ is absolute pressure and $T + T_o$ is absolute temperature.

Due to the fact that $P_o$ and $T_o$ are constant, $$m_a = \frac{K_o y F P_a}{T_a} \quad (9)$$

where $$P_a = P + P_o \quad (10)$$

$$T_a = T + T_o, \text{ and} \quad (11)$$

$$K_o = \frac{KT_o}{P_o} \quad (12)$$

The structures shown in the FIGURE perform source or arithmetic functions all by means which are individually old but are new in combination.

All the structures shown in the FIGURE are analog sources or analog computers except perhaps for plant 10, needle valve 17 and air supply 15.

In the FIGURE there is provided a pressure source 23 to produce an analog signal on lead 34 proportional to P. An analog temperature source 24, an $H_2S$ analyzer (analog source) 25, adders 26 and 27, $P_o$ and $T_o$ analog sources, analog dividers 28 and 29, and analog multipliers 30, 31 and 32.

Source 24 produces an analog output signal on lead 33 proportional to T in inlet conduit 20 in, for example, degrees Fahrenheit.

Source 23 produces an analog of gage pressure within conduit 20 on output lead 34.

$H_2S$ analyzer 25 produces an analog in mole percent of the $H_2S$ in conduit 20. This analog appears on output lead 35.

Analyzer 25 may be conventional and of the type disclosed in U.S. Pat. No. 3,796,887, if desired. Preferably infrared is employed. The analysis wavelength would preferably be 2.635 microns and the reference wavelength would preferably be 2.94 microns. Also, an incandescent source would be used with an infrared sensor. The probe would also be closed.

The stoichiometric amount of air or $O_2$ for each pound of $H_2S$ would be about 25.3 standard cubic feet.

If desired, in equation (9), the units of F may be cubic feet per hour, $P_a$ may be in pounds per square inch absolute, and $T+T_o$ and $T_a$ may be temperature in degrees Rankine. $m_a$ may be in standard cubic feet of air per hour if $K_o$ is another constant.

Source 24 may include a conventional Wheatstone bridge type of circuit if desired.

Adder 27, divider 29, and multipliers 30, 31 and 32 are connected in succession in that order from source 24 to needle valve 17 via lead 19. Lead 19 is connected from the output of multiplier 32 to needle valve 17.

Adder 26 and divider 28 are connected in succession in that order from source 23 to an input lead 36 of multiplier 31.

$P_o$ is supplied to adder 26 and divider 28. $T_o$ is supplied to adder 27 and divider 29.

Lead 35 is connected to one input of multiplier 30.

Adder 26 has an output lead 37.

Adder 27, divider 29, multiplier 30 and multiplier 31 have respective output leads 38, 39, 40 and 41.

The following leads carry signals proportional to the values indicated below:

| Lead | Value |
| --- | --- |
| 34 | $P$ |
| 37 | $P + P_o$ |
| 36 | $\dfrac{P + P_o}{P_o}$ |
| 33 | $T$ |
| 38 | $T + T_o$ |
| 39 | $\dfrac{T_o}{T + T_o}$ |
| 40 | $\dfrac{yT_o}{T + T_o}$ |
| 41 | $\dfrac{yT_o(P + P_o)}{P_o(T + T_o)}$ |
| 19 | $\dfrac{yFT_o(P + P_o)}{P_o(T + T_o)}$ |

The constant K may be adjustable with a variable resistor or otherwise to vary the gain or the like of an amplifier in multiplier 32 or in any other conventional way.

OPERATION

Needle valve 17 in the FIGURE is controlled by the signal on input lead 19 thereto to a valve such that $m_a$ in equation (8) is accurate for the current magnitude of the terms on the right hand side of the equation.

The left end of inlet conduit 20 may be connected to, if desired, the $H_2S$ output of any number of such sources including but not limited to an amine desulfurization plant for sour gas or from a refinery or as illustrated on page 724 (FIG. 561) of a bound volume of the Air Pollution Manual, Second Edition, published by the Environmental Protection Agency, Research Triangle Park, N.C., May, 1973. Plant 10 may, if desired, be of the type illustrated in the same book identified in the immediately preceding sentence at page 728 therein in FIG. 564.

Conduit 20 may contain acid gas including $H_2S$ emanating from the said amine desulfurization plant. Acid gas from an amine desulfurization plant may typically contain 65 mole percent $H_2S$, 33 mole percent $CO_2$, and 2 mole percent hydrocarbons.

What is claimed is:

1. Apparatus for recovering elemental sulfur, said apparatus comprising: a first source of a first gas including hydrogen sulfide ($H_2S$); a sulfur recovery plant having a combustion chamber, and a reaction chamber connected from said combustion chamber; an inlet conduit connected from said first source to said combustion chamber to deliver the entire flow of said first gas from said first source to said combustion chamber; a second source of a second gas including oxygen ($O_2$); detector means connected from said inlet conduit to produce an output signal proportional to the total mass flow rate $m_b$ of $H_2S$ in said inlet conduit; and source means connected from said detector means, said source means being responsive to said output signal to cause an oxygen mass flow rate $m_a$ from said second source independent of all outputs of said reaction chamber, said mass flow rate $m_a$ also being such that $$m_a = 8m_b/17,$$

the combustion of said $H_2S$ being incomplete in that said mass flow rate $m_a$ as defined above is only one-third of the stoichiometric rate for complete combustion, said incomplete combustion resulting in a flow of $H_2S$ through said combustion chamber, said reaction chamber being connected from said combustion chamber to receive said unburnt $H_2S$ passing through said combustion chamber and to receive combustion products resulting from burning only a portion of said $H_2S$, burning of one-third $H_2S$ taking place in said combustion chamber according to the equation $$H_2S + 3/2O_2 \rightarrow SO_2 + H_2O,$$

where $SO_2$ is sulfur dioxide, and $H_2O$ is water, reaction of said unburnt $H_2S$ with said $SO_2$ taking place in said reaction chamber according to the equation $$2H_2S + SO_2 \rightarrow 3S + 2H_2O,$$

where S is elemental sulfur.

2. The invention as described in claim 1, wherein said detector means operates as a function of the pressure in said inlet conduit.

3. The invention as described in claim 1, wherein said detector means operates as a function of the temperature of said first gas.

4. The invention as described in claim 1, wherein said detector means operates as a function of the percent by weight of $H_2S$ in said first gas.

5. The invention as described in claim 1, wherein said detector means operates as a function of the volume flow rate of said first gas.

* * * * *